US012809889B2

(12) United States Patent
Ravuru et al.

(10) Patent No.: US 12,809,889 B2
(45) Date of Patent: Nov. 24, 2026

(54) TEMPORARY EVENT GENERATION

(71) Applicants: Rakesh Ravuru, San Jose, CA (US); Sivaramakrishnan Natarajan, San Jose, CA (US); Anjini Shukla, Los Altos, CA (US); Anand Shastri, Seattle, WA (US)

(72) Inventors: Rakesh Ravuru, San Jose, CA (US); Sivaramakrishnan Natarajan, San Jose, CA (US); Anjini Shukla, Los Altos, CA (US); Anand Shastri, Seattle, WA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 19/298,839

(22) Filed: Aug. 13, 2025

(65) Prior Publication Data

US 2026/0050612 A1 Feb. 19, 2026

Related U.S. Application Data

(60) Provisional application No. 63/682,995, filed on Aug. 14, 2024.

(51) Int. Cl.

*G06F 16/29* (2019.01)
*G06F 16/242* (2019.01)
(Continued)

(52) U.S. Cl.

CPC .......... *G06F 16/29* (2019.01); *G06F 16/2425* (2019.01); *G06F 16/248* (2019.01); *G06F 16/9537* (2019.01); *G06N 3/0475* (2023.01)

(58) Field of Classification Search

CPC .... G06F 16/29; G06F 16/2425; G06F 16/248; G06F 16/9537; G06N 3/0475
(Continued)

(56) References Cited

U.S. PATENT DOCUMENTS

| | | | | |
|---|---|---|---|---|
| 9,244,149 | B2 | 1/2016 | Piersol et al. | |
| 9,250,088 | B1 * | 2/2016 | Kozolchyk | H04W 4/029 |

(Continued)

FOREIGN PATENT DOCUMENTS

| | | | | | |
|---|---|---|---|---|---|
| CN | 114036414 | A * | 2/2022 | G06F 16/9537 |
| IT | 202200014386 | A1 * | 1/2024 | H04W 4/02 |
| JP | H07160860 | A * | 6/1995 | |

OTHER PUBLICATIONS

"Add temporary locations on the map WordPress", Retrieved from Internet: https://creativeminds.helpscoutdocs.com/article/2867-cm-map-locations-cmml-use-case-how-to-add-temporary-locations-polygons-and-time-based-location-layers-on-the-map, (2024), 28 pgs.

(Continued)

*Primary Examiner* — Phuong Thao Cao
(74) *Attorney, Agent, or Firm* — Schwegman Lundberg & Woessner, P.A.

(57) ABSTRACT

Systems and methods herein describe a temporary event generation system. The temporary event generation system accesses a user query, queries a database using the user query, based on a determination that the target location associated with the user query does not exist in the database, the temporary event generation system receives a modified user query, generates a first subset of historical user query data based on filtering the historical user query data using map coordinates, generates a second subset of historical user query data from the first subset of historical user query data based on filtering the first subset of historical user query data using a similarity metric of query terms, and generates a temporary event with event map coordinates and an event location name.

20 Claims, 4 Drawing Sheets

(51) Int. Cl.
*G06F 16/248* (2019.01)
*G06F 16/9537* (2019.01)
*G06N 3/0475* (2023.01)

(58) Field of Classification Search
USPC .......................................................... 707/769
See application file for complete search history.

(56) References Cited

U.S. PATENT DOCUMENTS

| | | | | |
|---|---|---|---|---|
| 9,355,387 | B1 | 5/2016 | Dixon et al. | |
| 2013/0325329 | A1* | 12/2013 | Gupta | G01C 21/3811 701/450 |
| 2014/0310268 | A1* | 10/2014 | Rosenstock | G06F 16/29 707/724 |
| 2015/0099461 | A1* | 4/2015 | Holden | G01C 21/3682 455/39 |
| 2015/0172860 | A1* | 6/2015 | Rosenstock | H04W 4/021 707/769 |
| 2023/0258459 | A1* | 8/2023 | Robinson | G01C 21/3407 701/428 |

OTHER PUBLICATIONS

"Dynamic Rideshare Pickup Locations Youtube Video PAM A", YouTube Video https://www.youtube.com/watch?v=LkfDZfsv6_o, (Sep. 2023), 2 pgs.

"Event Name Takeover PAM B", YouTube Video https://www.youtube.com/watch?v=OP6_4QkMqvk, (Oct. 2023), 2 pgs.

"Google Maps Introduces Public Event Creation Rolling Out Now", [Online]. Retrieved from the Internet: <https://9to5google.com/2019/03/25/google-maps-event-creation/>, (Mar. 25, 2019), 6 pgs.

"Google Maps Pin How Temporary Business Location Share Works", [Online]. Retrieved from the Internet: <https://www.unwirement.com/2023/03/google-maps-pin-how-temporary- business.html>, (Mar. 17, 2023), 7 pgs.

* cited by examiner

TEMPORARY EVENT GENERATION

CROSS-REFERENCE TO RELATED APPLICATION

This patent application claims the benefit of U.S. Provisional Ser. No. 63/682,995, filed Aug. 14, 2024, which is incorporated by reference herein in its entirety.

Systems and methods herein generally relate to generating search results. More specifically, but not by way of limitations, solutions herein describe temporary event generation.

BACKGROUND

Modern rideshare applications employ algorithms to generate search results tailored to user queries. These algorithms analyze factors such as location, availability of drivers, traffic conditions, and user preferences in real-time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
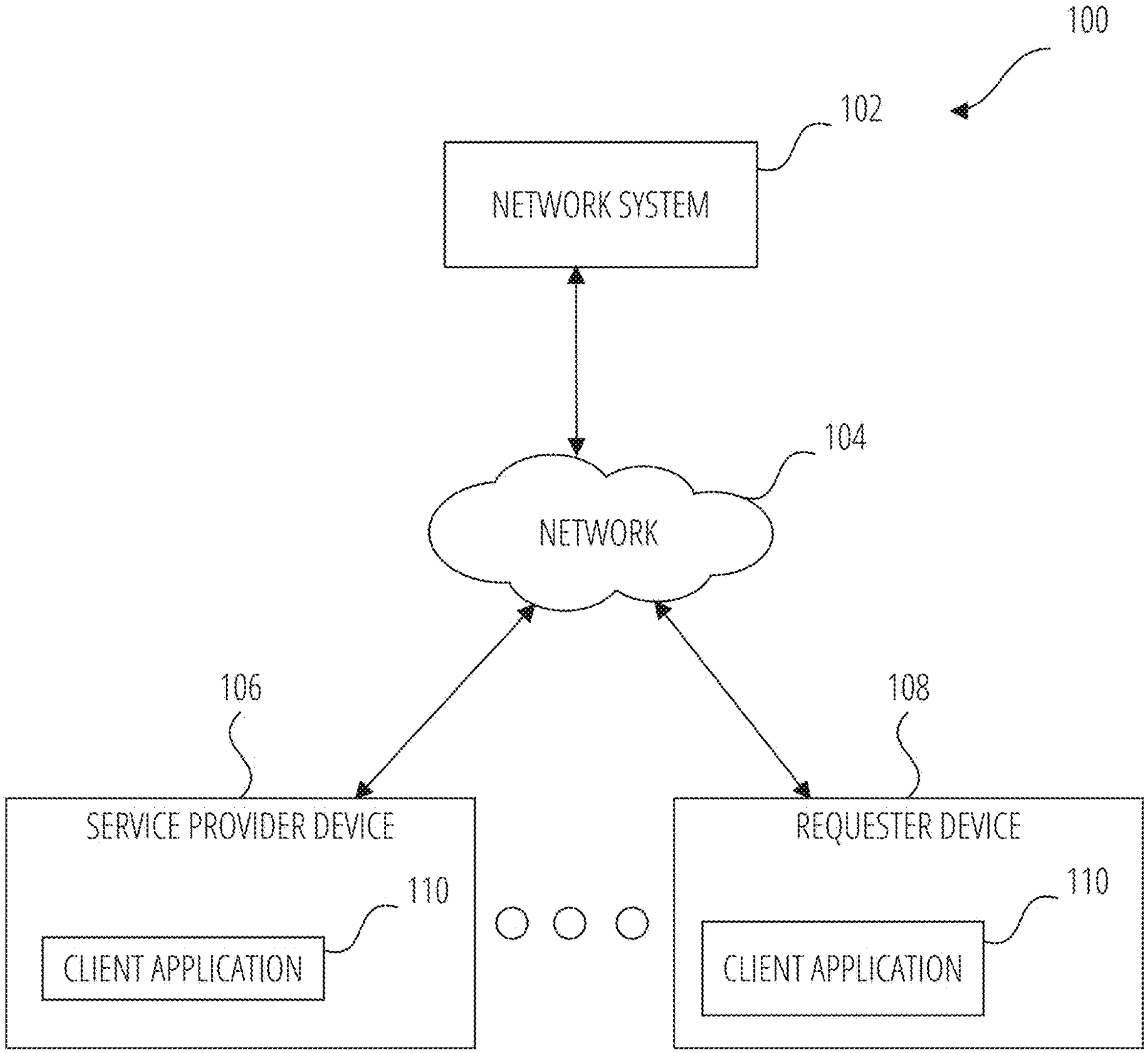
FIG. 1 is a diagram illustrating a network environment 100 suitable for providing temporary events within a list of search results, according to example embodiments.

Described herein is a temporary event generation system. The temporary event generation system allows for temporary events to surface as possible query results for users searching for the temporary event based on specific event names or addresses. Traditional location databases in rideshare applications are designed for permanent or semi-permanent locations with established addresses and consistent naming conventions. However, temporary events such as pop-up markets, street fairs, outdoor concerts, or seasonal festivals often lack formal addresses and may use colloquial or event-specific names that do not correspond to standard geographic databases. This creates a significant gap in search functionality where users cannot efficiently locate and request transportation to these events, forcing them to resort to manual address entry or imprecise map-based selection. The temporary event generation system addresses this technical problem by implementing a dynamic clustering approach that leverages collective user behavior patterns. When multiple users search for similar terms in proximity to the same geographic area within a compressed timeframe, the system recognizes this as a signal indicating the presence of a temporary event. By analyzing both spatial clustering and semantic clustering, the system can automatically generate temporary location entries that bridge the gap between user intent and database availability, thereby improving search accuracy and user experience in rideshare applications.

For example, a user may wish to search for a holiday fair in Santa Clara in a ride-share application. Since the holiday fair is a temporary or pop-up event, however, a search result specific for this event is not available. To solve this technical problem, the temporary event generation system identifies when multiple users are entering queries related to a specific location, for which there is no search result, within a short period of time and generates a temporary event based on the user queries. For example, the temporary event generation system accesses a user query from a ride-share application. The user query can be associated with a target location (e.g., a destination address) and a target query term (e.g., a location name associated with the destination address). The temporary event generation system queries a database of locations using the user query. If the target location is found within the database, the temporary event generation system will initiate a transportation trip request to the target location. If the target location is not found within the database, the temporary event generation system will attempt to generate a temporary event for the target location. For example, the temporary event generation system will receive a modified user query specifying the geographic location address.

Specifically, the temporary event generation system can prompt the user to input a modified user query that specifies a geographic location address. The modified user query can include a modified textual query with query terms that specify the geographic location address or can be a user input or gesture onto a map interface that indicates the geographic location address.

The temporary event generation system will attempt to generate a temporary event associated with the modified user query. Specifically, the temporary event generation system accesses historical user query data corresponding to previous user queries and generates a first cluster of historical user query data. The first cluster is generated based on the previous user queries having map coordinates that are within a threshold distance of the geographic location address. The temporary event generation system generates a second cluster from the first cluster. The second cluster is generated based on user queries that have query terms that are within the same embedding space as the target query term. The temporary event generation system generates a temporary event and stores the map coordinates associated with the temporary event and a location name associated with the temporary event in the database. The map coordinates of the temporary event are based on map coordinates of the location data associated with the second luster. The location name for the temporary event is generated using a generative neural network and can be trained on the previous user queries associated with the first cluster. Further details of the temporary event generation system are described below.

FIG. 1 is a diagram illustrating a network environment 100 suitable for providing accurate and customized search results. The network environment 100 includes a network system 102 communicatively coupled via a network 104 to a service provider device 106 of a driver or service provider and a requester device 108 of a user or requester (e.g., rider). In example embodiments, the network system 102 comprises components that obtain, store, and analyze data received from the service provider device 106 or the requester device 108 in order to generate temporary events. More particularly, the network system 102 analyzes historical user query data to determine if a location should be designated as a temporary location based on various signals received from the service provider device 106 or the requester device 108. The components of the network system 102 are described in more detail in connection with FIG. 2 and FIG. 3.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the service provider device 106 and the requester device 108 are portable electronic devices such as smartphones, tablet devices, wearable computing devices (e.g., smartwatches), or similar devices. Alternatively, the service provider device 106 can correspond to an on-board computing system of a vehicle. The service provider device 106 and the requester device 108 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The service provider device 106 and the requester device 108 interact with the network system 102 through a client application 110 stored thereon. The client application 110 allows for exchange of information with the network system 102 via user interfaces, as well as in background. For example, the client application 110 may determine and/or provide location information of the service provider device 106 and the requester device 108 (e.g., current location in latitude and longitude), barometer readings, or signal strengths (e.g., Wi-Fi and Bluetooth signal strengths) via the network 104, for analysis and storage. In example embodiments, the location information is used by the network system 102 for generating accurate search results, as will be discussed in more details below.

In example embodiments, a first user (e.g., a requester or rider) operates the requester device 108 that executes the client application 110 to communicate with the network system 102 to make a request for a transportation service such as transport or delivery service (referred to collectively as a "trip"). In example embodiments, the client application 110 presents, via user interfaces, the recommendation of one or more generated search results that the first user can select as their destination for the transportation service as part of the request.

A second user (e.g., a service provider or driver) operates the service provider device 106 to execute the client application 110 that communicates with the network system 102 to exchange information associated with providing the transportation service (e.g., to the user of the requester device 108). The client application 110 presents information via user interfaces to the second user of the service provider device 106, such as invitations to provide the transportation service, navigation instructions, and pickup and drop-off locations of people or items to be transported. The client application 110 also provides data to the network system 102 such as a current location (e.g., coordinates such as latitude and longitude), associated with the service provider device 106 or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 3 and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of client devices (e.g., service provider device 106, requester device 108) may be embodied within the network environment 100. Furthermore, some components or functions of the network environment 100 may be combined or located elsewhere in the network environment 100. For example, some of the functions of the network system 102 may be embodied within other systems or devices of the network environment 100. Additionally, some of the functions of the client devices (e.g., service provider device 106, requester device 108) may be embodied within the network system 102. While only a single network system 102 is shown, alternative embodiments may contemplate having more than one network system 102 to perform server operations discussed herein for the network system 102.

Figure 2:
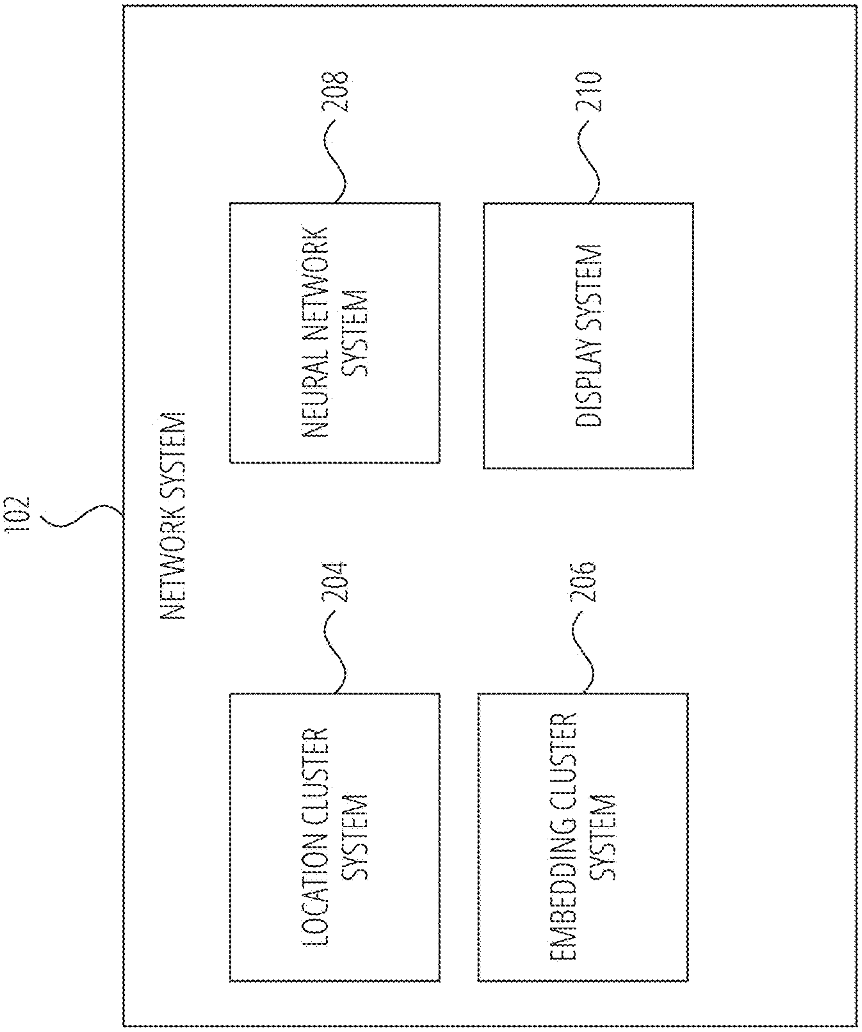
FIG. 2 is a block diagram illustrating components of the network system, according to some example embodiments.

FIG. 2 is a block diagram illustrating components of the network system 102, according to some example embodiments. In various embodiments the network system 102 receives search queries from one or more user devices (e.g., service provider device 106 and requester device 108) and analyzes historical user query data to generate accurate search results. The network system 102 receives a search query, analyzes historical q user uery data that has similar aspects to the search query and generates search results which are provided to a device from which the search query was received from. To enable these operations, the network system 102 comprises a location cluster system 204, embedding cluster system 206, a neural network system 208, and a display system 210, all configured to communicate with each other (e.g., via a bus, shared memory, or a switch).

The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The location cluster system 204 generates a location cluster for a target location using historical user query data. For example, the location cluster system 204 identifies latitude and longitude map coordinates of the target location and searches historical user query data that includes locations that are within a predefined threshold of the identified latitude and longitude map coordinates. The predefined threshold can be measured in distance (e.g., 0.5 miles or 2 miles).

The embedding cluster system 206 generates an embedding space cluster for the target location from the location cluster generated by the location cluster system 204. For example, the embedding cluster system 206 identifies a location name associated with the target location and searches historical user query data that includes location names that are similar to the identified location name. The similarity between location names can be measured, for example, using cosine similarity.

The neural network system 208 generates a location name for a temporary event. The neural network system 208 can include a generative model. As referred to herein a generative model is any deep-learning model that generates data based on a set of training data. For example, the generative model of the neural network system 208 includes a generative model that generates contextually relevant location names for a temporary event. The generative model is trained on a dataset of location names. Generative models can generate new data that resembles data they were trained on. For example, generative models can generate text, images, and audio. An example generative model that generates text includes large language models (LLM). An LLM is trained on a large dataset of text with the objective during training being predicting the next sequence of words in a given context.

The display system 210 causes display of the generated temporary event on a graphical user interface (GUI) of a computer device. The generated temporary event is displayed in response to a user query. The generated temporary event can be displayed as part of a list of search results (e.g., in the form of a drop-down menu or scrollable carousel list). In some examples, the generated temporary event includes a display element (e.g., an icon) that indicates that the location is a temporary event and not a permanent event.

Figure 3:
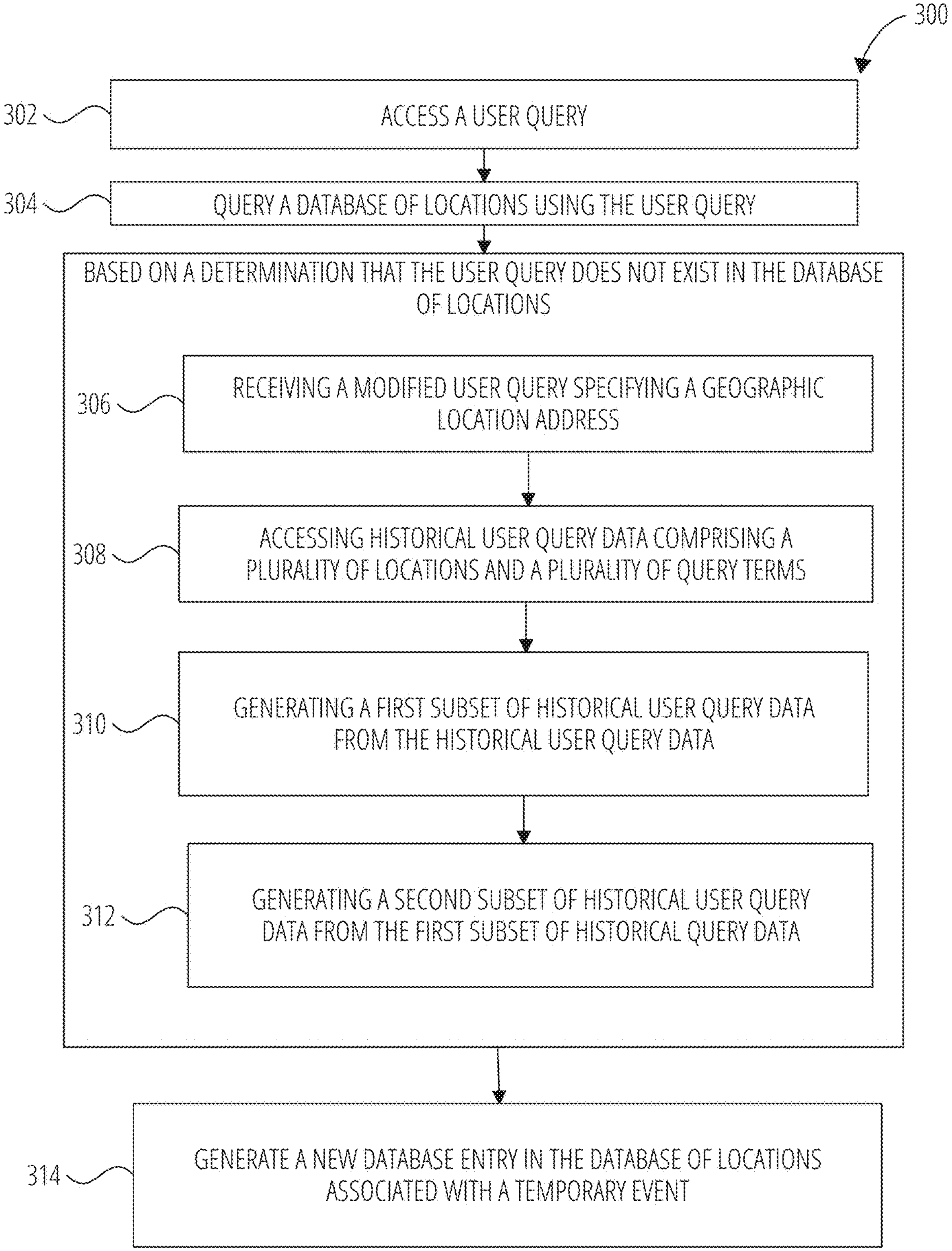
FIG. 3 is an illustration of a process for generating a temporary event, according to example embodiments.

FIG. 3 illustrates a process 300 for generating a temporary event, according to example embodiments. Although the described flow diagram below can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems. In one example, the processor in a network system 102, the processor in a service provider device 106, the processor in a requester device 108, or any combination thereof, can perform the operations in process 300.

In some examples, a user of a rideshare application wishes to request a ride from their home to a pop-up event (e.g., the San Francisco Art Fair). The user enters the query, "San Francisco Art Fair" into a GUI of the rideshare application. However, the rideshare application is unable to surface any query results because there is no entry in a database of locations corresponding to "San Francisco Art Fair." As a result, the user must manually enter a street address or use a map interface from within the rideshare application to indicate where the destination is located. Process 300 may be initiated in response to the above scenario. For example, when a user enters a query which surfaces inaccurate results or no matching results, the processor in a network system 102, the processor in a service provider device 106, the processor in a requester device 108, or any combination thereof, initiates the operations in process 300.

In some examples, the operations in process 300 are initiated in response to the processor receiving multiple user queries which surface inaccurate results or no matching results within a period of time. For example, if many users (e.g., at least 50 users or any suitable threshold number) search for the "San Francisco Art Fair" or input a similar query to the geographic location address within the San Francisco Art Fair within a period of time (e.g., 2 days), the processor will initiate the operations in process 300. Thus, the process 300 can be initiated in real-time by the processor in response to receiving a single user query that has inaccurate query results or no matching query results or can be initiated in real-time by the process in response after receiving a minimum number of user queries relating to a single geographic location address that have inaccurate query results or no query results within a predefined period of time. Further details of the process 300 are described below.

At operation 302 a processor accesses a user query associated with a target location and a target query term. The user query can be received from a requester device 108. For example, a user of the requester device 108 can input the user query via an input field on a graphical user interface (GUI) on a client application 110.

At operation 304 the processor queries a database of locations using the user query to determine whether there are locations that correspond to the user query. In one example, the processor converts the textual user query to floating-point numbers and the processor uses the floating-point numbers that represent the textural user query to search the database of locations. In some examples, converting the textual query to floating point numbers allow for mathematical operations and similarity calculations are computationally efficient.

In some examples, the processor may employ text embedding techniques (e.g., word2vec, transformer-based embeddings, or custom neural network embeddings) to convert the textual user query into a floating-point vector representation. The floating-point vector representation enables the processor to perform mathematical similarity calculations to identify semantically related locations in the database even when exact text matches are not found. In some implementations, the database may be indexed using vector search algorithms or approximate nearest neighbor techniques to efficiently retrieve candidate locations based on the numerical query representation.

If the processor determines that no existing locations in the database correspond to the user query, the processor performs operations 306-314 to determine if the user query corresponds to a pop-up or temporary event. For example, if at least one of the target location or the target query term is not found in the database of locations, the processor performs operations 306-314.

At operation 306, the processor receives a modified user query specifying a geographic location address. For example, the processor can prompt a user of the requester device 108 to enter a specific geographic address into an input text field or can prompt the user of the requester device 108 to indicate on a map interface displayed on the requester device 108 the specific geographic location address (e.g., by dropping a pin or providing tactile input on the map interface).

At operation 308, the processor accesses historical user query data stored in one or more datastores. The historical user query data includes a plurality of locations and a plurality of query terms associated with previous user queries received from a plurality of requester devices 108. In one example, the processor accesses historical user query data that includes user queries that were previously received from a plurality of requester devices 108 over a predefined period (e.g., in the previous week). Each historical user query in the historical user query data includes a location defined by map coordinates and at least one query term.

At operation 310, the processor generates a first subset of historical user query data from the historical user query data. Each query datapoint in the historical user query data is associated with location data and query term data. The location data includes geographical map coordinates, including latitude and longitude coordinates. The processor generates the first subset of historical user query data by determining a subset of query data points that have map coordinates that are within a threshold distance of map coordinates associated with the target location. The threshold distance can be, for example, half a mile or two miles. In one example, the first subset of historical user query data is generated by the location cluster system 204.

At operation 312, the processor generates a second subset of historical user query data from the first subset of historical user query data. The processor generates the second subset of historical user query data by determining a subset of the first subset of historical user query data that has associated query term data with a similarity value within a threshold range of the target query term. For example, the processor generates a similarity value for each query in the historical user query data and the target query term using cosine similarity or other method for determining a similarity between terms. The processor determines which historical user query data has a similarity value within the threshold range of the target query term to include in the second subset. In one example, the second subset of historical user query data is generated by the embedding cluster system 206.

In some examples, the processor may employ various text similarity algorithms (e.g., cosine similarity, Jaccard similarity, or semantic distance measures) to calculate similarity values between query terms and historical user query data within the embedding space. The processor may utilize pre-trained language models or domain-specific embeddings to capture semantic relationships between terms, enabling the system to identify conceptually related queries even when they use different terminology (e.g., 'art fair,' 'craft market,' and 'artisan festival'). In some examples, the processor may apply fuzzy matching techniques, edit distance calculations, or n-gram analysis as supplementary methods to handle variations in spelling, abbreviations, or colloquial expressions commonly used in location-based queries.

At operation 314, the processor generates a new database entry in the database of locations associated with the temporary event. The new database entry includes event map coordinates of the temporary event and an event location name of the temporary event. The event map coordinates are based on map coordinates of the location data in the second subset of historical user query data. For example, the processor ranks historical user query data in the second subset of historical user query data based on the previously generated similarity values. The second subset of historical user query data can be ranked using any suitable ranking algorithm (e.g., top-k ranking). The location data associated with highest ranked datapoint in the second subset of historical user query data can be used to determine event map coordinates of the temporary event. The processor can generate an event location name using a generative model as described in connection with the neural network system 208 above. For example, the generative model of the neural network system 208 can be an LLM trained on a training dataset that includes event names. For example, the training dataset can include concert tour names, sporting event names, political event names, query terms in historical user query data, and so forth.

In some examples, the generative model used for creating event location names (e.g. the LLM) may employ various neural network architectures such as transformer-based language models, recurrent neural networks (RNNs), long short-term memory (LSTM) networks, or generative adversarial networks (GANs) trained specifically for location name generation. For example, the neural network system 208 may utilize a large language model (LLM) architecture that has been fine-tuned on a training dataset comprising diverse event naming conventions, including concert tour names, sporting event names, political event names, and query terms from historical user query data as described herein. The training process may involve supervised learning techniques where the model learns to generate contextually appropriate names based on input features such as geographic location, event type indicators derived from clustered query terms, temporal patterns, and regional naming conventions. In some implementations, the processor may employ reinforcement learning techniques to optimize name generation based on user acceptance rates and subsequent query success metrics or may utilize ensemble methods that combine multiple generative models to improve naming accuracy and reduce the likelihood of generating inappropriate or misleading event names. The system may also implement validation layers that filter generated names through profanity detection algorithms, trademark conflict checking, or semantic appropriateness scoring to ensure the generated temporary event names are suitable for public display in the rideshare application interface.

In some examples, the processor causes presentation of the user query on a graphical user interface (GUI) on a computer device. The GUI is associated with a client application 110, in some examples. A user of a requester device 108 inputs the user query in an input field via a GUI of the client application 110. After performing the operations 302-314, the processor can cause presentation of the temporary event in a list of query results. The temporary event can be presented as a selectable user interface element (e.g., a button or menu item) on the GUI. The processor causes presentation of the temporary event in real-time or near real-time in response to accessing the user query as described above in operation 302.

In some examples, the processor further causes presentation a display element indicating that the event is temporarily identified using the map coordinates and the location name. The display element distinguishes the temporary event from permanent events. In some examples the display element includes an icon proximate to the location name or a stylized textual effect of the location name. The display element can further include an indication a period of time during which the temporary event will be presented on the GUI. For example, the display element can include an expiration date associated with the display of the temporary event. The presentation of the temporary event can be performed by the display system 210.

The processor can cause the generated temporary event to be available for presentation for a limited period of time. For example, after a predefined minimum number of days, if the processor receives zero or a minimal number of new user queries associated with the temporary event, the processor determines that the temporary event no longer exists, and removes the temporary event from the database of locations as a possible query result. For example, the processor accesses new user queries associated with the temporary event, determines that a number of the subsequent new user queries falls below a threshold and in response to the determination, deletes the new database entry from the database of locations.

Alternatively, if a number of occurrences of subsequent user queries associated with the temporary event throughout a duration of a predefined range of time (e.g., two weeks) exceeds a threshold, the processor determines that the temporary event is in fact a permanent event. Designation of the temporary event as a permanent event can alter aspects of the display of the now permanent event as a query result (e.g., the query result is displayed without a display element indicating that it is a temporary event). In some examples, the processor performs an extra authentication process before changing designation of a temporary event to a permanent event. The extra authentication process can include transmitting an authentication request to a machine learning model to analyze user queries associated with the temporary event. The machine learning model can be trained on historical user query data to generate a determination of whether an event is temporary or permanent based on aspects of the historical user query data including query patterns, frequency of queries, and so forth. The extra authentication process can alternatively or additionally include transmitting a request to receive human verification from an operator of the network system 102.

In some examples the processor supports various error handling mechanisms and procedures for addressing edge cases that may arise during the process 300. For example, when insufficient historical user query data exists within the threshold distance or similarity parameters to form meaningful clusters, the processor may expand the threshold parameters incrementally, request additional user input to refine the geographic location, or defer temporary event generation until sufficient data accumulates. In cases where the clustering algorithms produce conflicting or ambiguous results, such as when multiple distinct events appear to be occurring in the same geographic area, the processor may generate separate temporary events with disambiguating location names or prompt users for additional clarifying information.

The processor may also implement validation mechanisms to prevent false positive temporary event generation, such as requiring a minimum confidence score based on cluster density, implementing spam detection algorithms to filter out erroneous or malicious queries, and establishing maximum limits on the number of temporary events that can be generated within a specific geographic area during a given time period. Additionally, the processor may include fallback procedures when real-time processing requirements cannot be met, such as queuing temporary event generation requests for batch processing or providing users with alternative search suggestions based on existing permanent locations in the database.

In some examples, the processor may incorporate various user experience enhancements to improve interaction and feedback during the temporary event generation process. For example, the processor may provide real-time status indicators on the graphical user interface to inform users when temporary event generation is in progress, such as progress bars, loading animations, or textual updates indicating the current processing stage (e.g., "Analyzing location data," "Generating event details"). The processor may cause display confidence scores or reliability indicators alongside generated temporary events to help users assess the accuracy of the suggested locations and may include user feedback mechanisms such as rating systems, thumbs up/down buttons, or comment fields that allow users to validate or correct temporary event information for future improvements.

Figure 4:
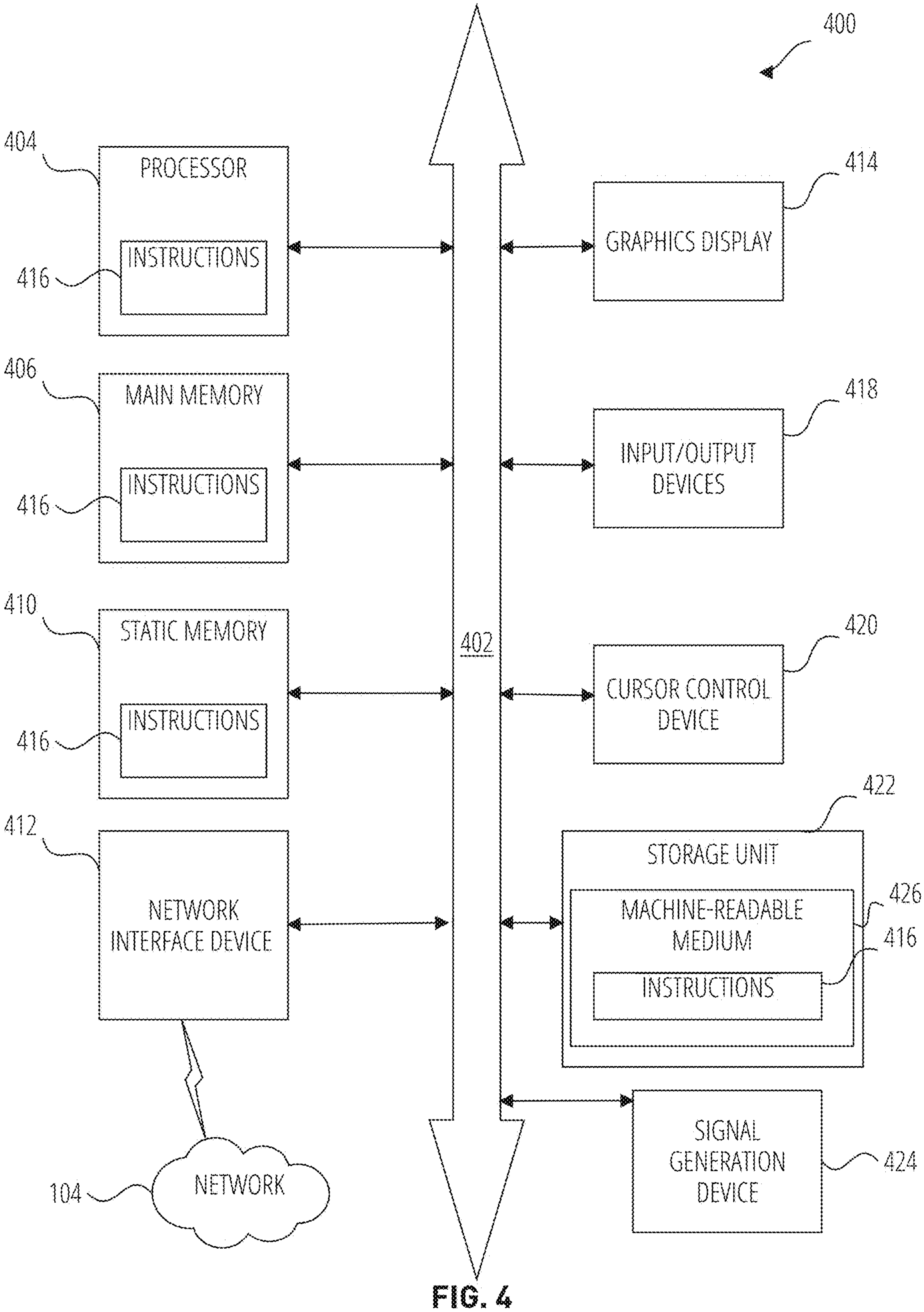
FIG. 4 shows a diagrammatic representation of a machine in the example form of a machine within which a set of instructions, for causing the machine to perform any one or more of the methodologies discussed herein, may be executed.

FIG. 4 shows a diagrammatic representation of a machine in the example form of a machine 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 400 includes a processor 404 (e.g., a central processing unit (CPU) a graphics processing unit (GPU) or both), a main memory 406 and a static memory 410 (with one or more sets of instructions 416) which communicate with each other via a bus 402. The machine 400 may further include a graphics display 414 (e.g., a liquid crystal display (LCD) or a cathode ray tube (CRT)). The machine 400 also includes an alphanumeric input device 418 (e.g., a keyboard), a cursor control device 420 (e.g., a mouse), a disk storage unit 422, a signal generation device 424 (e.g., a speaker) and a network interface device 412.

The disk storage unit 422 includes a non-transitory computer-readable medium (e.g., machine-readable medium 426) on which is stored one or more sets of instructions 416 (e.g., software) embodying any one or more of the methodologies or functions described herein. The instructions 416 may also reside, completely or at least partially, within the main memory 406 and/or within the processor 404 during execution thereof by the computer system, the main memory 406 and the processor 404 also constituting non-transitory computer-readable media.

The instructions 416 may further be transmitted or received over a network 104 via the network interface device 412.

While not illustrated, it is understood that that machine 400 can further include sensors that create data regarding a thermal state of the machine 400, an orientation of the machine 400 and a current location of the machine 400. In various embodiments, the machine 400 includes a temperature sensor, an accelerometer and/or a global position system for identifying the current location of the machine 400.

While the non-transitory computer-readable medium, machine-readable medium 426 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the subject matter described herein. The term "computer-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:

accessing a user query associated with a target location and a target query term from a computer device;

querying a database of locations using the user query;

based on determining that the target location associated with the user query does not exist in the database of locations:

receiving a modified user query specifying a geographic location address;

accessing historical user query data, the historical user query data comprising a plurality of locations and a plurality of query terms corresponding to previous user queries from the historical user query data;

generating a first subset of historical user query data from the historical user query data, each location in the first subset of historical user query data having map coordinates that are within a threshold distance of map coordinates associated with the geographic location address;

generating a second subset of historical user query data from the first subset of historical user query data, each query term in the second subset of historical user query data having a cosine similarity value within a threshold range with the target query term; and generating a new database entry in the database of locations associated with a temporary event, the new database entry comprising event map coordinates based on map coordinates of the second subset of historical user query data and an event location name for the temporary event.

2. The method of claim 1, further comprising:

causing presentation on a graphical user interface (GUI) of the temporary event in a list of query results for the user query, the temporary event presented as a selectable user interface element on the GUI.

3. The method of claim 2, wherein the temporary event is designated with a display element indicating that the event is temporarily identified using the event map coordinates and the event location name.

4. The method of claim 3, wherein the display element comprises a period of time during which the temporary event will be presented on the GUI.

5. The method of claim 1, wherein the event location name is generated using a generative neural network.

6. The method of claim 1, wherein the historical user query data comprises previous user queries that were received within a predefined range of time.

7. The method of claim 1, further comprising:

accessing new user queries input after the user query and associated with the temporary event;

determining that a number of the new user queries falls below a threshold; and in response to the determination, deleting the new database entry from the database of locations.

8. The method of claim 1, further comprising:

accessing new user queries input after the user query and associated with the temporary event;

determining that a number of the new user queries accessed over a predefined range of time exceeds a threshold;

based on the determination, determining that the temporary event is a permanent event; and transmitting an authentication request associated with the permanent event.

9. A computing system comprising:

a processor; and a memory storing instructions that, when executed by the processor, configure the system to perform operations comprising:

accessing a user query associated with a target location and a target query term from a computer device;

querying a database of locations using the user query;

based on determining that the target location associated with the user query does not exist in the database of locations:

receiving a modified user query specifying a geographic location address;

accessing historical user query data, the historical user query data comprising a plurality of locations and a plurality of query terms corresponding to previous user queries from the historical user query data;

generating a first subset of historical user query data from the historical user query data, each location in the first subset of historical user query data having map coordinates that are within a threshold distance of map coordinates associated with the geographic location address;

generating a second subset of historical user query data from the first subset of historical user query data, each query term in the second subset of historical user query data having a cosine similarity value within a threshold range with the target query term; and generating a new database entry in the database of locations associated with a temporary event, the new database entry comprising event map coordinates based on map coordinates of the second subset of historical user query data and an event location name for the temporary event.

10. The computing system of claim 9, further comprising:

causing presentation on a graphical user interface (GUI) of the temporary event in a list of query results for the user query, the temporary event presented as a selectable user interface element on the GUI.

11. The computing system of claim 10, wherein the temporary event is designated with a display element indicating that the event is temporarily identified using the event map coordinates and the event location name.

12. The computing system of claim 11, wherein the display element comprises a period of time during which the temporary event will be presented on the GUI.

13. The computing system of claim 9, wherein the event location name is generated using a generative neural network.

14. The computing system of claim 9, wherein the historical user query data comprises previous user queries that were received within a predefined range of time.

15. The computing system of claim 9, further comprising:

accessing new user queries input after the user query and associated with the temporary event;

determining that a number of the new user queries falls below a threshold; and in response to the determination, deleting the new database entry from the database of locations.

16. The computing system of claim 9, further comprising:

accessing new user queries input after the user query and associated with the temporary event;

determining that a number of the new user queries accessed over a predefined range of time exceeds a threshold;

based on the determination, determining that the temporary event is a permanent event; and transmitting an authentication request associated with the permanent event.

17. A non-transitory computer-readable storage medium, the computer-readable storage medium including instructions that when executed by a computer, cause the computer to perform operations comprising:

accessing a user query associated with a target location and a target query term from a computer device;

querying a database of locations using the user query;

based on determining that the target location associated with the user query does not exist in the database of locations:

receiving a modified user query specifying a geographic location address;

accessing historical user query data, the historical user query data comprising a plurality of locations and a plurality of query terms corresponding to previous user queries from the historical user query data;

generating a first subset of historical user query data from the historical user query data, each location in the first subset of historical user query data having map coordinates that are within a threshold distance of map coordinates associated with the geographic location address;

generating a second subset of historical user query data from the first subset of historical user query data, each query term in the second subset of historical user query data having a cosine similarity value within a threshold range with the target query term; and generating a new database entry in the database of locations associated with a temporary event, the new database entry comprising event map coordinates based on map coordinates of the second subset of historical user query data and an event location name for the temporary event.

18. The non-transitory computer-readable storage medium of claim 17, further comprising:

causing presentation on a graphical user interface (GUI) of the temporary event in a list of query results for the user query, the temporary event presented as a selectable user interface element on the GUI.

19. The non-transitory computer-readable storage medium of claim 18, wherein the temporary event is designated with a display element indicating that the event is temporarily identified using the event map coordinates and the event location name.

20. The non-transitory computer-readable storage medium of claim 19, wherein the display element comprises a period of time during which the temporary event will be presented on the GUI.

* * * * *